United States Patent [19]

Taylor, Jr.

[11] Patent Number: 4,616,229
[45] Date of Patent: Oct. 7, 1986

[54] SYSTEM AND METHOD OF COMPENSATING A DOPPLER PROCESSOR FOR INPUT UNBALANCE AND AN UNBALANCE MEASURING SENSOR FOR USE THEREIN

[75] Inventor: John W. Taylor, Jr., Baltimore, Md.

[73] Assignee: Westinghouse Electric Corp., Pittsburgh, Pa.

[21] Appl. No.: 537,900

[22] Filed: Sep. 30, 1983

[51] Int. Cl.⁴ .......................... G01S 7/40; G01S 13/04
[52] U.S. Cl. ..................................... 342/171; 342/194
[58] Field of Search ................ 343/5 NQ, 5 DP, 17.7, 343/379–381, 383, 384, 418, 7.7, 7 A

[56] References Cited

U.S. PATENT DOCUMENTS 3,950,750 4/1976 Churchill et al. ........... 343/5 DP X
4,003,054 1/1977 Goldstone ................... 343/5 DP X
4,122,488 10/1978 Martin .................................. 343/7.7
4,489,392 12/1984 Lewis .................................... 343/381

Primary Examiner—Thomas H. Tarcza
Assistant Examiner—Mack Hellner

Attorney, Agent, or Firm—W. E. Zitelli

[57] ABSTRACT

A system and method of compensating a digital doppler processor for unbalance in in-phase I and quadrature Q signal inputs thereof is disclosed. The method includes the steps of measuring the unbalance in the I and Q signal inputs to the digital doppler processor, determining a desired set of weighting coefficients based on the measured unbalance, and performing doppler filter calculations in the digital doppler processor with the desired set of weighting coefficients. The system comprises a sensor for measuring the unbalance in the I and Q signal inputs to the digital doppler processor, and apparatus for determining a desired set of weighting coefficients for the doppler filter calculations of the doppler processor based on the measured unbalance of the sensor. The disclosure further includes a sensor system for measuring uncompensated unbalance in the in-phase I and quadrature Q input signals of a digital doppler processor utilizing the outputs of at least one doppler filter of the set of digital doppler filters of the doppler processor.

28 Claims, 11 Drawing Figures

| PHASE | D1 | D2 | D3 |
|-------|----|----|----|
| 0° | 1 | 1 | 1 |
| 90° | 2 | 1 | 2 |
| 180° | 2 | 2 | 1 |
| 270° | 1 | 2 | 2 |

SYSTEM AND METHOD OF COMPENSATING A DOPPLER PROCESSOR FOR INPUT UNBALANCE AND AN UNBALANCE MEASURING SENSOR FOR USE THEREIN

BACKGROUND OF THE INVENTION

The present invention relates to digital doppler processors, in general, and more particularly, to a method and system for compensating the doppler processor for unbalance in the in-phase I and quadrature Q input signals thereof, and a sensing system for measuring the uncompensated unbalance in the I and Q signal inputs.

Digital doppler filters, such as an N-pulse digital filter, for example, are generally included in a digital doppler processor to process I and Q input signals to produce complex output signals $X+jY$ which may be represented by a summation of a weighted set of the complex input signals. Generally, simplicity dictates creation of pairs of doppler filters having mirror-image frequency responses which may be exemplified by equation (1) below:

$$X + jY = \sum_{n=1}^{N} (A_n \pm jB_n)(I_n + jQ_n) \quad (1)$$

$$= \sum_{n=1}^{N} [(A_n I_n \mp B_n Q_n) + j(\pm B_n I_n + A_n Q_n)],$$

where $A_n \pm jB_n$ is representative of a set of complex weighting coefficients which create a pair of filters with mirror-image responses: the gain of the filter generated by weight set $A_n + jB_n$ to doppler frequency $+f$ is identical to the gain of the filter generated by weight set $A_n - jB_n$ to doppler frequency $-f$.

However, practically, digital doppler filters process in-phase I and quadrature Q input signals having unbalanced gain and non-zero bias. The resulting complex distorted outputs $X+jY$ may be exemplified by equation (2), found below:

$$X = \sum_{n=1}^{N}(kA_{nx}I_n \mp B_{nx}Q_n/k) + \bar{I}\sum_{n=1}^{N}A_{nx} \mp \bar{Q}\sum_{n=1}^{N}B_{nx}$$

$$Y = \sum_{n=1}^{N}(\pm kB_{ny}I_n + A_{ny}Q_n/k) \pm \bar{I}\sum_{n=1}^{N}B_{ny} + \bar{Q}\sum_{n=1}^{N}A_{ny} \quad (2)$$

where the gain unbalance k is defined as $k^2=(I/Q)$, and $\bar{I}$ and $\bar{Q}$ represent the real and imaginary components of the input bias error, respectively. In addition, the weighting vector of the digital doppler filter may be defined in relation to the gain unbalance of the filter inputs as follows:

$$\left.\begin{array}{l}A_n \pm jB_n \text{ for real and imaginary outputs when } k = 1 \\ A_{nx} \pm jB_{nx} \text{ for real outputs when } k = 1 \\ A_{ny} \pm jB_{ny} \text{ for imaginary outputs when } k = 1\end{array}\right\} \quad (3)$$

Accordingly, the filter output may be expressed as:

$$(X - \bar{X}) + j(Y - \bar{Y}), \quad (4)$$

where, $$\left.\begin{array}{l}\bar{X} = \bar{I}\sum_{n=1}^{N}A_{nx} \mp \bar{Q}\sum_{n=1}^{N}B_{nx} \\ \bar{Y} = \pm \bar{I}\sum_{n=1}^{N}B_{ny} + \bar{Q}\sum_{n=1}^{N}A_{ny}\end{array}\right\} \quad (5)$$

Practical implementations of digital doppler filters having compensation systems to correct for errors in the I and Q input signals are exemplified in the following references:

1. F. E. Churchill et al., "The Correction of I and Q Errors in a Coherent Processor", IEEE Transactions AES-17, No. 1, January 1981, pages 131–136;
2. U.S. Pat. No. 3,950,750, entitled "Radar System Having Quadrature Phase Detector Compensator", issued to F. E. Churchill et al., on Apr. 13, 1976;
3. U.S. Pat. No. 4,003,054, entitled "Method of Compensating for Imbalances in a Quadrature Demodulator", issued to B. J. Goldstone on Jan. 11, 1977; and
4. U.S. Pat. No. 4,122,448, entitled "Automatic Phase and Gain Balance Controller for a Base Band Processor", issued to R. G. Martin on Oct. 24, 1978.

These prior systems, especially the ones described in the aforementioned references to Churchill et al. are operative in a radar receiver to correct radar echo I and Q signals detected at the output of a set of analog-to-digital (A/D) converters of the receiver, based on measured unbalance in the gain and phase relationship of the I and Q signals. The Churchill compensation includes two multiplications and an addition which are performed at the high data sampling rate of the A/D converter, typically on the order of several megahertz. Accordingly, the corrected I and Q signals contain many more digital bits than their corresponding uncorrected digitized signals at the output of the A/D converter. Generally, a portion of the bits of least significance of the corrected I and Q input signals are discarded by truncation and/or round-off operations. (Refer to FIG. 3 of the aforementioned referenced patent 3,950,750). It should be noted that the multipliers and adders of the compensation implementation may be either specific hardware elements dedicated to these tasks or arithmetic steps performed by a digital computer. The culmination of these operations effect compensated input data for the doppler-filtering processes of the radar, for example.

In either implementation, these arithmetic operations increase cost, and the truncation of their resulting outputs may degrade performance. For example, while truncations or round-off generally have no significant effect on signals in the pass band of the subsequent doppler-filter operations, they can cause very serious degradation of the ability of the doppler-filter to suppress interference within its rejection frequency band. In addition, the truncations and/or round-offs may also distort the statistical character of noise, affecting the ability of subsequent processing in a radar, for example, to maintain control of false alarm rate. It has been found that by avoiding truncation operations, the degradation of the ability to suppress ground clutter and to maintain control of false alarm rate as the noise level of the input signalling varies may be ameliorated.

Figure 1:
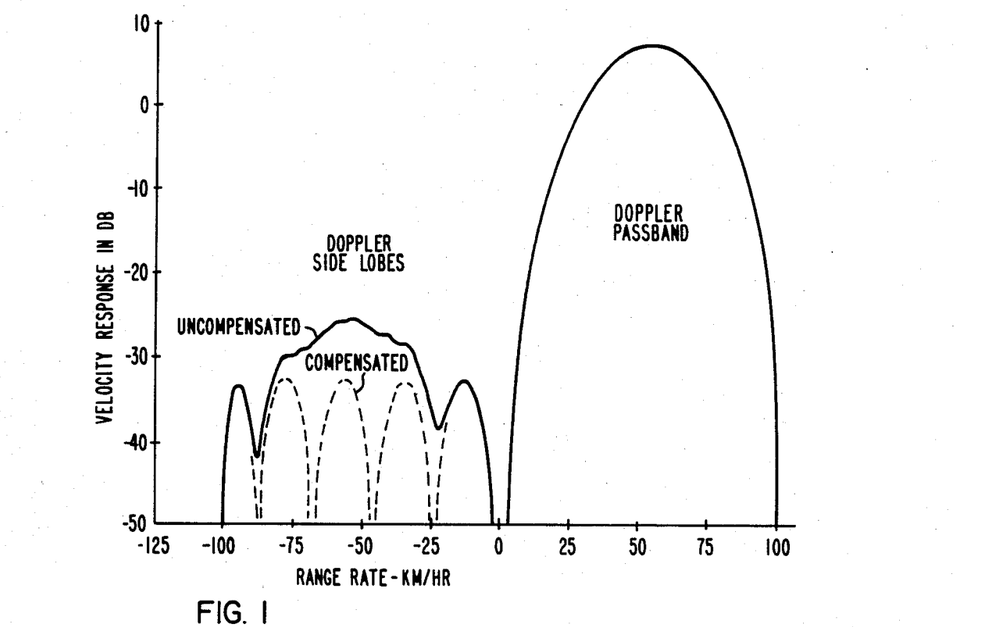
FIG. 1 is a graph illustrating the effect of a 4% (I/Q) gain unbalance on the doppler side lobes of a typical doppler filter, before and after compensation.

More specifically, in a radar application, a doppler filter processor generally operates to suppress two types of interference: ground clutter and rain (or chaff) clutter. Ground clutter, for example, comprises very strong radar echoes from terrain with a narrow doppler spectrum created by antenna scanning or foliage motion in the wind, centered at zero doppler frequency. On the other hand, radar reception from rain clutter is generally less intense but has a wider spectrum created by wind shear, centered at a doppler frequency corresponding to the mean radial wind speed. The ability of a digital doppler filter processor to suppress rain clutter is degraded by unbalance in the gain or phase of the I and Q input signals. FIG. 1 illustrates the effect of a 4% (I/Q) gain unbalance on the doppler side lobes of a typical doppler filter, before and after compensation. Note that the level of the worst doppler side lobe determines the suppression of rain or chaff relative to noise under the worst wind conditions; so, the ability to maintain low side lobes is of vital importance.

Although the ability to suppress ground clutter is not directly degraded by I and Q signal unbalance, the processes to compensate for this unbalance, however, can indirectly produce serious degradation by increasing the extent of distortions especially caused by truncation. Thus, it is particularly desirable to provide a solution which achieves the necessary compensation of the I and Q signal unbalance without the usual degradation of the ground clutter rejection capability.

In addition, the aforementioned references are also directed to methods of sensing the magnitude of gain and phase unbalance in the I and Q input signals to the digital doppler filters. The objective of these type sensors in general is to provide the necessary correction data at minimum cost. However, most of these type sensors impose certain constrains in order to reduce the number of costly mathematical operations, particularly multiplications and additions; but these constraints introduce problems.

For example, the sensor of U.S. Pat. No. 4,122,448 depends upon sampling a pure doppler test tone during "dead time", when its radar receiver is not occupied processing radar echoes. Since the interpulse period of the radar is generally variable, the phase of the test tone at the time of sampling is a parameter of concern. This particular reference teaches a sensor which requires precisely 0°, 90°, 180° and 270° phase conditions at successive samples of the injected test tone, a condition that is rarely possible to achieve. Other systems may require the phase change between successive samples to be very small, but this very low doppler test tone is difficult to generate to the required degree of purity.

The sensor directed to in the Churchill references eliminates the constraint on the phase of the injected test tone at the time of sampling, requiring only a precise test tone frequency. However, it achieves this relaxation by requiring six multiples and two divides (refer to equations 30 and 31 of the aforementioned paper to Churchill et al.), as well as sundry additions and subtractions. On the other hand, the Churchill sensing system is more tolerant of small distortions in the A/D conversions than the other sensing systems, because unbalance may be estimated from a large number of data samples with different phase conditions. That is, random errors tend to be reduced by averaging.

In summary, all of the aforementioned methods and systems for measuring and compensating for the I and Q signal unbalances have drawbacks which prevent their widespread application. While the Churchill et al. method and system is the most generally useful, it, however, is incompatible with pulse-to-pulse changes of interpulse period and is the most costly because of the required multiplications, divisions, and additions. The disclosed method and system found herebelow proposes to overcome these deficiencies.

SUMMARY OF THE INVENTION

In accordance with the present invention, a system for compensating a digital doppler processor for unbalance in in-phase and quadrature Q signal inputs thereof includes a sensor for measuring the unbalance in the I and Q signal inputs to the digital doppler processor, and means for determining a desired set of weighting coefficients for the doppler filter calculations of the digital doppler processor based on the measured unbalance of the sensor. In one embodiment, a memory is used for storing a precomputed set of weighting coefficients for each condition of a predetermined set of gain unbalance conditions. In this case, the sensor may generate a digitally coded address representative of the present gain unbalance condition based on the corresponding measured gain unbalance of the I and Q input signals. The coded address may be used for accessing the desired set of precomputed weighting coefficients corresponding to the present gain unbalance condition from the memory for use in the doppler filter calculations of the digital doppler processor. In another embodiment, the desired set of weighting coefficients may be calculated as a function of the corresponding measured gain unbalance in the I and Q signal inputs.

Another aspect of the present invention includes a compensating method which comprises the steps of measuring the unbalance in the I and Q signal inputs, determining the desired set of weighting coefficients based on the measured unbalance, and performing doppler filter calculations in the doppler processor with the desired set of weighting coefficients. In the memory embodiment, the determining step includes the steps of precomputing a set of weighting coefficients for each condition of a predetermined set of gain unbalance conditions, identifying the present gain unbalance condition from the corresponding measured gain unbalance in the I and Q signal inputs, and selecting the desired set of weighting coefficients from the precomputed sets of weighting coefficients based on the identified present gain unbalance condition. In the calculator embodiment, the step of determining includes the step of computing the desired set of weighting coefficients as a function of the corresponding measured gain unbalance in the I and Q signal inputs.

Another aspect of the present invention includes a sensor system for measuring uncompensated unbalance in the I and Q input signals of the doppler processor which includes a set of digital doppler filters. The I and Q input signals are provided to the doppler processor through respective I and Q channels. The sensor system may include means for generating a test frequency signal having imposed thereon a predetermined doppler frequency content and for injecting the test frequency signal, at times, through the I and Q channels to render the I and Q component signals thereof at their respective inputs of the doppler processor. One doppler filter of the doppler processor has characteristics of substantially rejecting signals having the predetermined doppler frequency content at the output thereof and substantially passing signals of a doppler frequency content representative of the uncompensated unbalance in the I and Q input signals to the output thereof. In accordance with this aspect of the present invention, the sensor system includes a first means for generating a reference signal representative of the phase of the predetermined doppler frequency content of the test frequency signal at the output of the one doppler filter, and second means governed by the phase reference signal to demodulate the output signalling of the one doppler filter in response to the injected test frequency signal for generating separate signals representative of uncompensated gain and phase unbalance in the I and Q input signals to the doppler processor. The second means may further include an integrator for each generated signal for the integration thereof.

In one embodiment of the present invention, the doppler processor includes another doppler filter having characteristics of substantially passing signals having the predetermined doppler frequency content to the output thereof and substantially rejecting signals of a doppler frequency content representative of the uncompensated unbalance in the I and Q input signals at the output thereof. In this case, the first means determines the phase of the output signalling of the another doppler filter in response to the injected test frequency signal and generates a reference signal representative thereof to govern the second means. More specifically, the another doppler filter, which is preferably a mirror-image of the one doppler filter, substantially passes signals representative of the real and imaginary components of the doppler frequency content of the injected test frequency signal and the first means determines which phase region of a predetermined set of phase regions the phase of the passed real and imaginary signals falls into and generates a phase reference signal corresponding to the determined phase region which is used to govern the second means. In connection with this embodiment, the real and imaginary component signals passed by the one doppler filter in response to the injected test frequency signal includes signals representative of the polarity thereof. Accordingly, the second means is governed by the phase reference signal to select one of the polarity signals as representative of the uncompensated gain unbalance and another as representative of the uncompensated phase unbalance.

In still another embodiment, the second means may include a first comparator for determining which of three predetermined regions the real component of the one doppler filter occurs in and for generating a first set of coded signals representative of the comparison determination, a second comparator for determining which of three predetermined regions the imaginary component signal of the one doppler filter occurs in and for generating a second set of coded signals representative of the comparison determination, and means governed by the phase reference signal to select one of the first and second sets of coded signals as representative of the uncompensated gain unbalance and the other as representative of the uncompensated phase unbalance.

In these embodiments, the integrators may be embodied by conventional up/down counters governed by the respective selected signals representative of the uncompensated gain unbalance and uncompensated phase unbalance for the integration thereof.

DESCRIPTION OF THE PREFERRED EMBODIMENT

Figure 2:
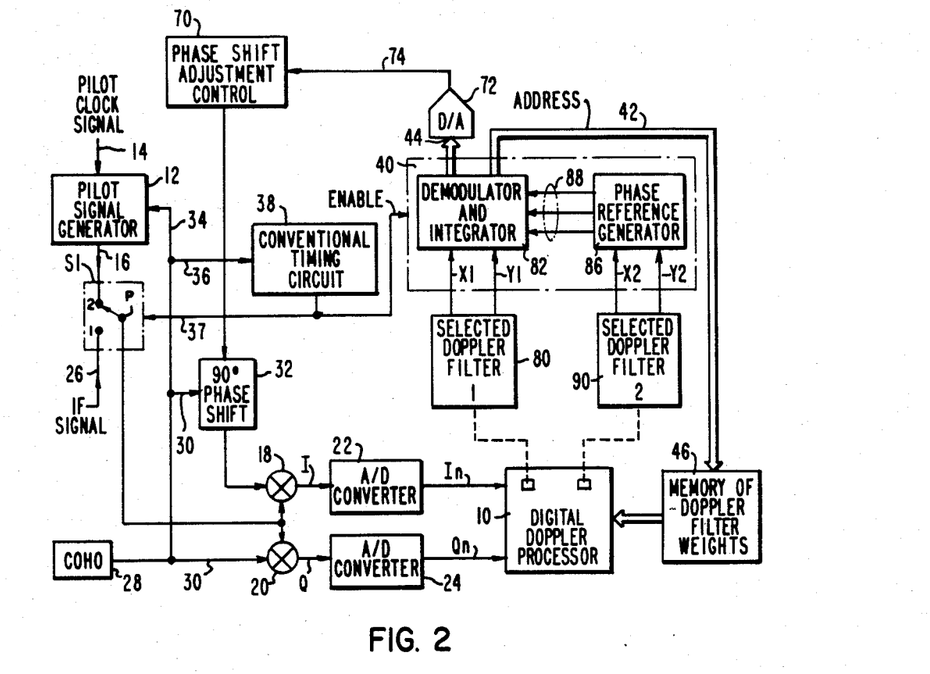
FIG. 2 is a block diagram schematic embodiment of an exemplary closed-loop system for compensating a digital doppler processor for unbalance in in-phase I and quadrature Q signal inputs thereof.

A block diagram schematic embodiment of an exemplary closed-loop system for compensating a digital doppler processor 10 for unbalance in in-phase I and quadrature Q signal inputs thereof is depicted in FIG. 2. More specifically, the system includes sensor apparatus for measuring the uncompensated unbalance in the I and Q signal inputs to the digital processor 10, and apparatus for determining a desired set of weighting coefficients for the doppler filter calculations of the digital doppler processor 10 based on the measured unbalance of the sensing apparatus.

Referring to FIG. 2, the present embodiment includes a conventional pilot or test frequency signal generator 12 which is responsive to a pilot clock signal 14, for example, to generate a test frequency signal 16 having imposed thereon a predetermined doppler frequency content. The test frequency signal 16 may be injected, at times, through conventonal I and Q channels to render in-phase and quadrature component signals thereof at their respective inputs of the doppler processor 10. This is accomplished in the present embodiment utilizing a single-pole-double-throw switch S1 which has a pole connection P commonly coupled to the I and Q channels of the digital doppler processor 10. Each I and Q channels includes a conventional mixer 18 and 20, and an A/D converter 22 and 24, respectively. Normally, switch S1 is switched to position 1 to permit an intermediate frequency IF signal 26 to flow to one input of each of the mixers 18 and 20.

A conventional coherent local oscillator COHO 28 generates various frequency signals which may be introduced to the doppler processing system. For example, one of the frequency signals 30 may be provided to one input of the mixer 20 to render the Q input signal of the doppler processor 10. The same frequency signal 30 may be phase shifted by 90° utilizing a conventional phase shifter 32 and coupled to another input of the mixer 18 to render the in-phase I signal input of the doppler processor 10. The COHO 28 may generate additional frequency reference signals 34 and 36 for operation of the signal generator 12 and a conventional timing circuit 38, respectively.

Digital doppler processing is commonly employed in radar receivers, which may use the digital doppler filters thereof to discriminate between desired aircraft echoes and undesired clutter interference. Thus, in describing the preferred embodiment, a radar application may be used as an example, although it is clearly understood that the present invention is not limited to this particular application. The I and Q signals may be sampled by the A/D converters 22 and 24, respectively, at a multiplicity of repeatable time intervals following each radar transmission. The samples at a particular time period after transmission n produce the signals $I_n$ and $Q_n$ which are provided to their respective inputs of the digital doppler processor 10. At times beyond the range of echoes of interest (i.e. radar dead time), the switch S1 may be governed by the timing circuit 38 to switch position 2 to inject the test frequency signal 16 into the I and Q channels of the system. For a more detailed description of a typical digital doppler processing system, reference is hereby made to the aforementioned cited U.S. Pat. No. 4,122,448.

The disclosed concept exploits the fact that the measured I and Q unbalance is a function which may vary slowly over long periods of time but can be considered constant for all of the requisite data samples used in forming the digital doppler filter outputs. Consequently, the correction of the multiplicity of requisite data $I_n$ and $Q_n$ samples rendered in the doppler filter computational time interval is unnecessary; instead, a single set of doppler filter weighting coefficients may be computed which may be used to compensate for the uncompensated unbalance in the I and Q input data samples. Accordingly, this closed-loop compensation concept reduces the number of high speed multiplications required in the correction of the multiplicity of input data samples as that described in connection with the aforementioned references to Churchill et al., for example, and furthermore, reduces the number of bits in the resulting product. Thus, if all of these data bits are accumulated without truncation, the doppler filter response is completely predictable, i.e., mathematically deterministic, and may be optimized to achieve maximum suppression of both rain and ground clutter.

Referring to FIG. 2, the preferred embodiment includes a sensor 40 for measuring the unbalance in the I and Q signal inputs to the doppler processor 10. The sensor 40 generates separate signals 42 and 44 representative of the gain and phase unbalance, respectively, in the I and Q signal inputs. A more detailed description of a suitable unbalance measuring sensor 40 will be provided hereinbelow. The present embodiment further includes apparatus for determining a desired set of weighting coefficients for the doppler filter calculations of the digital doppler processor 10 based on the unbalance measurement of the sensor 40.

In one embodiment, a memory 46 may be included for storing a pre-computed set of weighting coefficients for each condition of a predetermined set of gain unbalance conditions effected by the sensor 40 which includes apparatus for generating a digitally coded address over signal lines 42, the address being representative of the present gain unbalance condition based on the corresponding measured gain unbalance of the sensor 40. The address 42 may be provided to the memory 46 and may be used for accessing the desired set of pre-computed weighting coefficients corresponding to the present gain unbalance condition for use in the doppler filter calculations of the doppler processor 10. In an alternate embodiment as depicted by the block diagrams schematic of FIG. 3, the determining apparatus may include a calculator 50 for calculating the desired set of weighting coefficients as a function of the corresponding measured gain unbalance 42 generated by the sensor 40. The weighting coefficients may be calculated in 50 either concommitantly or sequentially as the case may be. For the sequential calculation case, the weighting coefficients may be stored in a temporary memory 52 until the complete set is formed prior to being provided to the doppler processor 10 for the doppler filter computations therein.

A preferred method for computing the weighting coefficients for use in either of the aforementioned embodiments exploits the fact that the cancellation of ground clutter in radar applications generally demands 20–30 dB better suppression capability than that of rain or chaff clutter. The procedure to be described herebelow minimizes the number of bits required in the weighted radar echo data in the accumulator. The instant compensational procedure is suitable for use in an N-pulse doppler filter of a digital doppler processor. The N-pulse doppler filters generally have at least one null or mathematical zero at the zero doppler frequency and therefore are mathematically equivalent to a cascade combination of a two-pulse digital canceller 60 and an (N−1) pulse filter 62 as exemplary depicted in the block diagram schematic of FIG. 4. The two-pulse canceller 60 provides a null at the zero doppler frequency which affords adequate cancellation of the ground clutter signalling prior to the N−1 pulse filter processing in 62. Consequently, the ground clutter and rain or chaff interference of the signal outputs 64 and 66 of the two-pulse canceller 60 are more compatible in intensity so the errors introduced by rounding off the N−1 weights to a finite number of bits produces comparable degradation of ability to suppress each type of undesirable clutter. In contrast, rounding off of the N weights and computations directly as provided for in the aforementioned prior art references produces much more serious impact on suppression of ground clutter than of rain or chaff interference. Alternate methods for computing the desired set of weighting coefficients will be provided in greater detail herebelow. Note that the weighting coefficients may be computed for an auxiliary zero doppler frequency filter or filter pair 63 without regard for the effect of round-off or suppression of ground clutter because this filter or filter pair 63 does not have this ability.

In summary then, the method of operating the compensating system includes the steps of measuring the unbalance in the I and Q signal inputs to the digital doppler processor 10 in the sensor 40, determining a desired set of weighting coefficients based on the measured unbalance, and performing the well-known doppler filter calculations in the doppler processor 10 with the desired set of weighting coefficients. In one embodiment, the step of determining includes the steps of precomputing a set of weighting coefficients for each condition of a predetermined set of gain unbalance conditions, identifying the present gain unbalance condition from the corresponding measured gain unbalance in the I and Q signal inputs, and selecting the desired set of weighting coefficients from the precomputed sets of weighting coefficients based on the identified present gain unbalance condition. In another embodiment, the step of determining includes the step of computing the desired set of weighting coefficients as a function of the corresponding measured gain unbalance and the I and Q signal inputs.

The following mathematical expressions may be used where the desired set of weighting coefficients are precomputed in accordance with a predetermined set of gain unbalance conditions:

$$\left.\begin{array}{l} A_{nx} = A_n/k_i \\ B_{nx} = k_i B_n \\ A_{ny} = k_i A_n \text{ and} \\ B_{ny} = B_n/k_i \end{array}\right\} \quad (6)$$

where $k_i$ represents each of a predetermined set of gain unbalance conditions $k_i$: i = 1 to M, where $A_n + jB_n$ (for n = 1 to N) represents the set of weighting coefficients of an N-pulse doppler filter for the balanced condition of $k_i = 1$, where for each of the unbalanced condition of $k_i \neq 1$, i = 1 to M, $A_{nx} + jB_{nx}$ (for n = 1 to N) represent the precomputed set of coefficients for calculating the real component of the doppler filter output for each condition i, and $A_{ny} + jB_{ny}$ (for n = 1 to N) represent the precomputed set of weighting coefficients for calculating the imaginary component of the doppler filter output of each condition i.

The precomputing method may additionally include the shifting of the phase conditions of the precomputed set of weighting coefficients $A_{nx} + jB_{nx}$ and $A_{ny} + jB_{ny}$ to satisfy the following expressions:

$$\sum_{n=1}^{N} B_{nx} = 0, \text{ and } \sum_{n=1}^{N} B_{ny} = 0. \quad (7)$$

Figure 4:
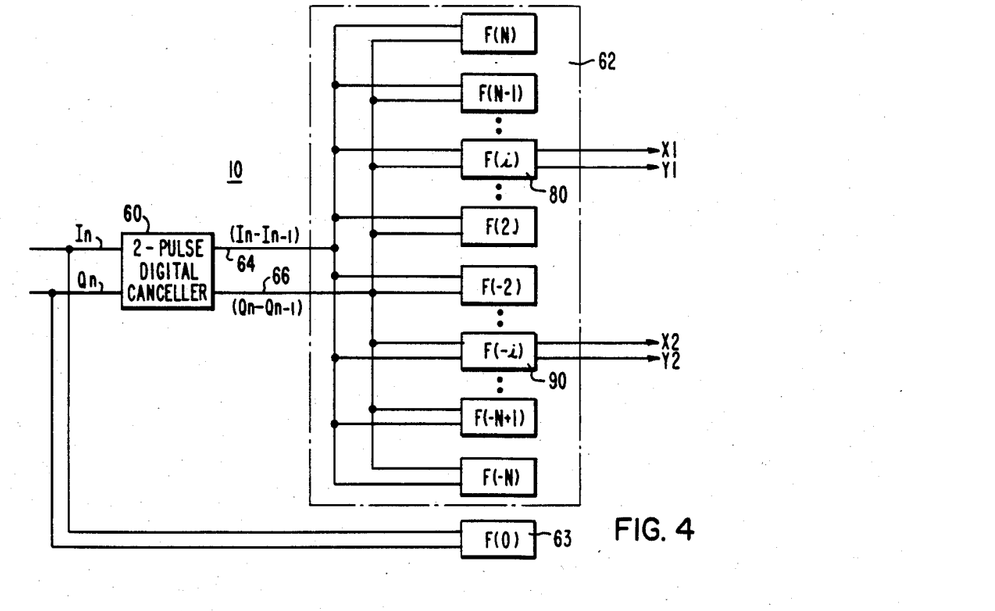
FIG. 4 is a block diagram schematic of a digital doppler processor including a set of digital doppler filters suitable for use in the embodiment of FIG. 2.

This step makes it possible to derive real $\overline{X}$ and imaginary $\overline{Y}$ of said corrections for the real X and imaginary Y doppler filter outputs of the zero doppler filter or filter pair 63, respectively, using the phase shifted precomputed weighting coefficients $A_{nx}$ and $A_{ny}$ in accordance with the following simplified expressions:

$$\left.\begin{array}{l} \overline{X} = \overline{I} \sum_{n=1}^{N} A_{nx} \text{ and} \\ \overline{Y} = \overline{Q} \sum_{n=1}^{N} A_{ny} \end{array}\right\} \quad (8)$$

where $\overline{I}$ and $\overline{Q}$ are representative of the real and imaginary components, respectively, of the input signal offset to the digital doppler processor 10.

Figure 3:
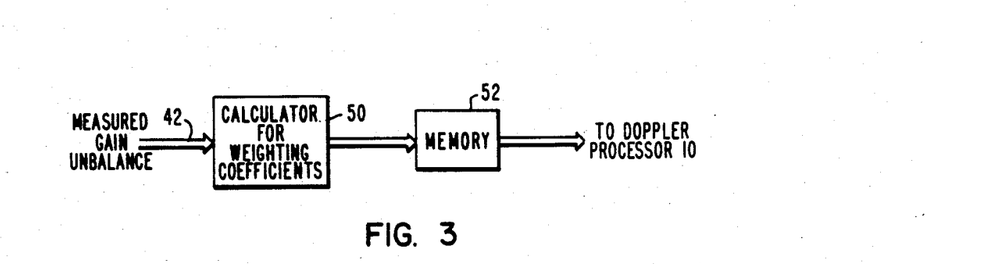
FIG. 3 is a block diagram schematic of an alternate embodiment for a portion of the compensating system depicted in FIG. 2.

In the alternate embodiment, as described in connection with the block diagram schematic of FIG. 3, the calculator 50 may compute the desired set of weighting coefficients in accordance with the above mathematical expressions (2) in which $k_i$ is replaced with k which represents the corresponding measured gain unbalance in the I and Q signal inputs as measured by the sensor 40. Thus, for the unbalanced condition of $k \neq 1$, $A_{nx} + jB_{nx}$ (for n = 1 to N) represent the desired set of weighting coefficients for calculating the real component of the doppler filter output, and $A_{ny} + jB_{ny}$ (for n = 1 to N) represent the desired set of weighting coefficients for calculating the imaginary component of the doppler filter output in the doppler processor 10. Similarly, the calculator 50 may include the process of shifting the phase conditions of the instantaneously computed set of complex weighting coefficients $A_{nx} + jB_{nx}$ and $A_{ny} + jB_{ny}$ in accordance with the above equations (7) to derive the $\overline{X}$ and $\overline{Y}$ of said corrections of equations (8) in which case, $\overline{I}$ and $\overline{Q}$ are representative of the real and imaginary components respectively of the corresponding input signal offset to the digital doppler filter.

TABLE I

| GAIN UNBAL STATE | PRECOMPUTED WEIGHTING COEFFICIENTS | | | | | | | | | | | | | | | |
|---|---|---|---|---|---|---|---|---|---|---|---|---|---|---|---|---|
| | A1 | B1 | A2 | B2 | A3 | B3 | A4 | B4 | A5 | B5 | A6 | B6 | A7 | B7 | A8 | B8 |
| 1 | 186 | 0 | −84 | −542 | −983 | 283 | 520 | 1271 | 1206 | −653 | −582 | −842 | −407 | 365 | 144 | 118 |
| | 186 | 0 | −84 | −540 | −985 | 281 | 522 | 1269 | 1208 | −651 | −584 | −842 | −407 | 365 | 144 | 118 |
| 2 | 185 | 0 | −83 | −543 | −981 | 283 | 519 | 1274 | 1204 | −654 | −582 | −844 | −406 | 366 | 144 | 118 |
| | 187 | 0 | −85 | −539 | −987 | 281 | 523 | 1266 | 1210 | −650 | −584 | −840 | −408 | 364 | 144 | 118 |
| 3 | 185 | 0 | −83 | −544 | −980 | 284 | 519 | 1276 | 1201 | −655 | −580 | −846 | −405 | 366 | 143 | 119 |
| | 187 | 0 | −85 | −538 | −988 | 280 | 523 | 1264 | 1213 | −649 | −586 | −838 | −409 | 364 | 145 | 117 |
| 4 | 185 | 0 | −84 | −545 | −977 | 284 | 517 | 1279 | 1199 | −657 | −579 | −847 | −404 | 367 | 143 | 119 |
| | 187 | 0 | −84 | −537 | −991 | 280 | 525 | 1261 | 1215 | −647 | −587 | −837 | −410 | 363 | 145 | 117 |
| 5 | 184 | 0 | −83 | −546 | −975 | 285 | 516 | 1281 | 1197 | −658 | −578 | −849 | −404 | 368 | 143 | 119 |
| | 188 | 0 | −85 | −536 | −993 | 279 | 526 | 1259 | 1217 | −646 | −588 | −835 | −410 | 362 | 145 | 117 |
| 6 | 184 | 0 | −83 | −547 | −974 | 285 | 516 | 1284 | 1194 | −659 | −577 | −851 | −402 | 369 | 142 | 119 |
| | 188 | 0 | −85 | −535 | −994 | 279 | 526 | 1256 | 1220 | −645 | −589 | −833 | −412 | 361 | 146 | 117 |
| 7 | 184 | 0 | −83 | −548 | −972 | 286 | 515 | 1286 | 1191 | −660 | −575 | −853 | −402 | 370 | 142 | 119 |
| | 188 | 0 | −85 | −534 | −996 | 278 | 527 | 1254 | 1223 | −644 | −591 | −831 | −412 | 360 | 146 | 117 |
| 8 | 183 | 0 | −82 | −549 | −970 | 286 | 513 | 1289 | 1190 | −662 | −575 | −854 | −401 | 370 | 142 | 120 |
| | 189 | 0 | −86 | −533 | −998 | 278 | 529 | 1251 | 1224 | −642 | −591 | −830 | −413 | 360 | 146 | 116 |
| 9 | 183 | 0 | −83 | −550 | −968 | 287 | 513 | 1291 | 1187 | −663 | −573 | −856 | −401 | 371 | 142 | 120 |
| | 189 | 0 | −85 | −532 | −1001 | 277 | 530 | 1249 | 1227 | −641 | −593 | −828 | −413 | 359 | 146 | 116 |
| 10 | 183 | 0 | −83 | −551 | −966 | 287 | 512 | 1294 | 1185 | −664 | −573 | −858 | −399 | 372 | 141 | 120 |
| | 189 | 0 | −85 | −531 | −1002 | 277 | 530 | 1247 | 1230 | −641 | −594 | −826 | −415 | 358 | 147 | 116 |
| 11 | 182 | 0 | −82 | −552 | −964 | 288 | 510 | 1296 | 1183 | −666 | −571 | −859 | −399 | 373 | 141 | 120 |

TABLE I-continued

| GAIN UNBAL STATE | PRECOMPUTED WEIGHTING COEFFICIENTS |||||||||||||||||
|---|---|---|---|---|---|---|---|---|---|---|---|---|---|---|---|---|
| | A1 | B1 | A2 | B2 | A3 | B3 | A4 | B4 | A5 | B5 | A6 | B6 | A7 | B7 | A8 | B8 |
| | 190 | 0 | −86 | −530 | −1004 | 276 | 532 | 1245 | 1231 | −639 | −595 | −825 | −415 | 357 | 147 | 116 |
| 12 | 182 | 0 | −82 | −553 | −963 | 288 | 510 | 1299 | 1180 | −667 | −570 | −861 | −398 | 373 | 141 | 121 |
| | 190 | 0 | −86 | −529 | −1006 | 276 | 533 | 1242 | 1234 | −638 | −596 | −823 | −416 | 357 | 147 | 115 |
| 13 | 182 | 0 | −82 | −554 | −961 | 289 | 509 | 1301 | 1178 | −668 | −569 | −863 | −398 | 374 | 141 | 121 |
| | 191 | 0 | −87 | −528 | −1008 | 275 | 534 | 1240 | 1237 | −637 | −598 | −821 | −417 | 356 | 148 | 115 |
| 14 | 181 | 0 | −82 | −555 | −958 | 289 | 507 | 1304 | 1176 | −670 | −568 | −864 | −396 | 375 | 140 | 121 |
| | 191 | 0 | −86 | −527 | −1010 | 275 | 534 | 1237 | 1239 | −635 | −598 | −821 | −418 | 356 | 148 | 115 |
| 15 | 181 | 0 | −82 | −556 | −957 | 290 | 507 | 1306 | 1174 | −671 | −567 | −866 | −396 | 376 | 140 | 121 |
| | 191 | 0 | −86 | −526 | −1012 | 274 | 536 | 1235 | 1241 | −634 | −600 | −819 | −418 | 355 | 148 | 115 |
| 16 | 181 | 0 | −82 | −557 | −955 | 290 | 506 | 1309 | 1171 | −672 | −566 | −868 | −395 | 376 | 140 | 122 |
| | 192 | 0 | −87 | −525 | −1014 | 274 | 537 | 1232 | 1244 | −633 | −601 | −817 | −419 | 354 | 148 | 115 |

Table I is an example of a memory table comprising 16 sets of gain unbalance conditions or states of eight pairs of weighting coefficients employed to form the set of precomputed filter weights for use in the compensation process as described hereabove. Note that when the gain of the I channel signal input exceeds that of the Q channel signal input, the upper line of each pair A B is used as the weighting coefficients $A_{nx} B_{nx}$ to compute the real filter output X in the doppler processor 10, and the pairs A B of the lower line are used as the weighting coefficients $A_{ny} B_{ny}$ to compute the imaginary filter output Y. Accordingly, when the gain of I is less than Q, the selection of the weighting coefficients of the two lines is reversed. In the present example, each set of weighting coefficients represents a gain unbalance condition change, relative to the neighboring sets of one part in 256, and therefore, the 16 sets of weighting coefficients can compensate for gain unbalance up to ±6.4%.

In connection with the embodiment of FIG. 4, the digital doppler processor 10 may include a two pulse digital canceller 60 and an N−1 pulse doppler filter 62 in cascade therewith for computing real X and imaginary Y components of the output of the N−1 pulse doppler filter in accordance with the following expressions:

$$\left. \begin{array}{l} X = \sum_{n=2}^{N} C_{nx}(I_n - I_{n-1}) \pm \sum_{n=2}^{N} D_{nx}(Q_n - Q_{n-1}), \text{ and} \\ Y = \sum_{n=2}^{N} \pm D_{ny}(I_n - I_{n-1}) + \sum_{n=2}^{N} C_{ny}(Q_n - Q_{n-1}), \end{array} \right\} \quad (9)$$

where:
$C_{nx} + jD_{nx}$ (for n=2 to N) represent the desired set of weighting coefficients for computing X,
$C_{ny} + jD_{ny}$ (for n=2 to N) represent the desired set of weighting coefficients for computing Y, and
$(I_n - I_{n-1})$ and $(Q_n - Q_{n-1})$, for n=2 to N, represent the in-phase and quadrature outputs, respectively, of the two-pulse digital canceller 60 for samples 1 to N of the real I and imaginary Q signal inputs.

Accordingly, the desired set of weighting coefficients in connection with that described hereabove for the N−1 pulse doppler filter 62 may be calculated in accordance with the following expressions:

$$\left. \begin{array}{l} C_{nx} = kC_n \\ C_{ny} = C_n/k \\ D_{nx} = D_n/k \\ D_{ny} = kD_n \end{array} \right\} \quad (10)$$

Where $C_2 = A_1$ and $C_{n+1} = A_n + C_n$ (for n=2 to N)
Where $D_2 = B_1$ and $D_{n+1} = B_n + D_n$ (for n=2 to N)
Where k represents the corresponding measured gain unbalance of the sensor, and
Where $A_n + jB_n$ (for n=1 to N) represent the set of weighting coefficients of an N-pulse doppler filter for the balanced condition of k=1.

While the foregoing description provides for gain unbalance compensation of the I and Q signal inputs of the doppler processor 10, it is understood that the phase unbalance may also be accomplished through use of determination of weighting coefficients of the doppler filters through utilization of a similar computational procedure as that of the gain unbalance, supra. The procedure, of course, would increase the size of the memory 46 for the embodiment of precomputed weighting coefficients to one of a three-dimensional variety for both the gain and phase set of predetermined conditions. The computations for the weighting coefficients in connection with the phase unbalance conditions is believed clearly evident to anyone skilled in the pertinent art from the gain unbalance equation examples provided hereabove.

However, in practical hardware, phase unbalance is generally small compared with amplitude or gain unbalance, and if any phase unbalance correction is required, it may be easily compensated for by use of a phase shift adjustment controller 70 in connection with the 90° phase shifter 32 of the COHO input 30 to one or both of the synchronous detectors 18 and 20 of the I and Q channels, respectively (refer to FIG. 2). In the present embodiment, referring to FIG. 2, the phase unbalance measurement 42 from the sensor 40 may be converted to an analog signal, utilizing a conventional digital-to-analog (D/A) converter 72, to control the controller 70. Because the phase shift adjustment of the controller 70 need vary over only a few degrees, a modest number of bits of control may provide very good accuracy; modest interaction with the amplitude of the COHO signal 30 may be tolerated because the output of most synchronous detectors, like 18 and 20, for example, are not sensitive to changes in COHO amplitude.

Digital compensation through determination of weighting coefficients of the doppler processor 10 for only amplitude or gain unbalance is considered simpler than compensation for both gain and phase unbalance. That is, if the weights are computed from the measured unbalance, the computation is simpler. However, if the weights are precomputed and stored in a memory like that shown at 46, for example, the size of the memory is substantially reduced for the case in which just the gain unbalance is used. In addition, where a vernier phase shift is introduced automatically, its cost may be offset by the simplification of the digital compensation process as described hereabove. Furthermore, in many cases, available synchronous detectors may provide adequate phase stability without automatic compensation.

The embodiment described in connection with FIG. 2, illustrates the measured phase error controlling a vernier phase shift combination 70/32 through a D/A converter 72. A differential phase shifter 32 may permit the use of a standard $\pi/2$ hybrid to achieve the approximately 90° phase shift because this type of phase shift can compensate for either positive or negative error. The differential phase shifter provides a vernier correction like $\pm 3°$, for example, so that a 6 bit D/A converter may correct to 0.1°, for example, As described hereabove, the measured gain unbalance is used to either determine a precomputed set of weighting coefficients from a memory like that shown at 46 in FIG. 2, for example, or is used in a calculator 50, like that shown in FIG. 3, for example, for the computation of a set of weighting coefficients based on the corresponding measurement thereof. Noteworthy is the fact that the gain unbalance compensation is applied directly to calculations performed by the doppler processor 10 and do not increase their complexity, but in the present embodiment as described in connection with FIG. 2, the phase unbalance compensation is applied to I and Q data provided to the inputs of the doppler processor 10. It is understood that this operational procedure affects the speed at which phase compensation may be made because, in contrast to the gain compensation, the doppler filter output may be composed of radar echo pulses with different phase corrections. In many radars, use of frequency agility or electron beam stepping creates a transient in the clutter echoes and apparatus in these cases is provided to prevent computing doppler filter outputs from data straddling two conditions. That is, by synchronizing phase unbalance corrections with this transient, any magnitude of phase unbalance step may be tolerated. However, in cases where the radar generates no transients, the doppler filter outputs may be computed every interpulse period of the radar; phase unbalance compensation in this case should be limited in speed to the ratio of the least significant bit of phase unbalance measurement to the number of interpulse periods between the first and last pulse of the requisite number of pulses used in forming the doppler filtered output data.

In summary, the compensation of the digital doppler processor 10 for uncompensated unbalance in the I and Q signal inputs by selecting appropriate weighting coefficients used in the doppler filter calculations rather than scaling the time-sampled data inputs makes truncation effects predictable and optimization feasible. In addition, the computational procedure of the doppler processor 10 described in connection with the embodiment of FIG. 2 for determining the integer weighting coefficients for a measured degree of gain (and phase) unbalance, naturally incorporates optimum round-off procedures to minimize distortion of critical doppler filter characteristics such as the ground clutter rejection notch. Moreover, storage of the computed weighting coefficients provides for more efficient use in real-time doppler processing in either the embodiment of a desired set of weights computed for the current unbalance measurement, or the embodiment of a multiplicity of sets of weighting coefficients precomputed for a predetermined set of unbalance conditions in which the desired set of weighting coefficients is selected by the corresponding unbalance measurement.

Figure 5:
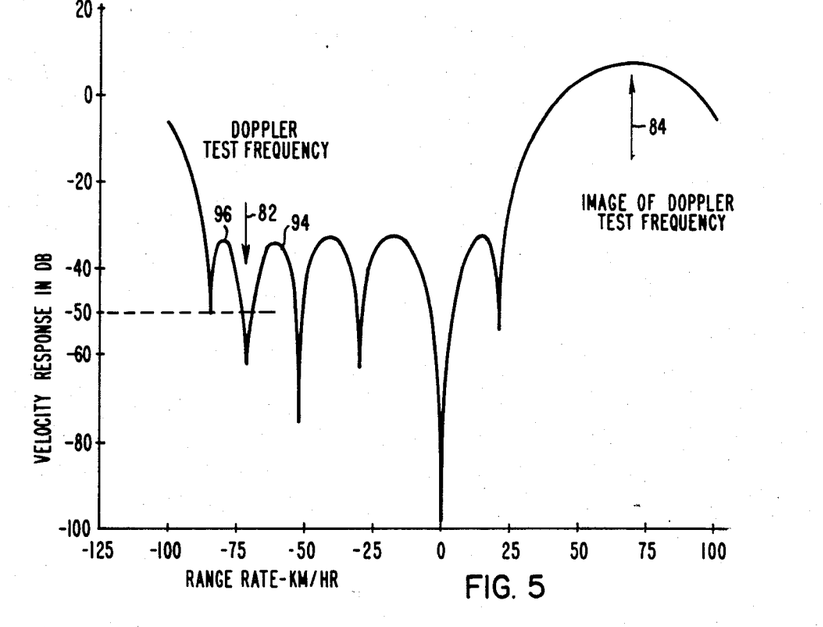
FIG. 5 is a graph illustrating filter characteristics of a doppler filter in the doppler processor suitable for use in connection with one aspect of the present invention.

Another aspect of the present invention includes a sensor system for measuring the uncompensated unbalance in the I and Q input signals of the digital doppler processor 10 which includes a set of digital doppler filters such as that depicted in the block diagram schematic of FIG. 4. The sensor system may include: the signal generator 12, governed by the clock signal 14 and the reference frequency signal 34 of the COHO 28, for generating a test frequency signal 16 having imposed thereon a predetermined doppler frequency content; and the switch S1 operated by the timing signal 37 via timing circuit 38 for injecting the test frequency signal 16, at times, through the I and Q channels of the doppler processor to render the I and Q component signals thereof at their respective inputs of the doppler processor 10. One doppler filter 80 of the doppler filter set is selected according to its filter characteristics of substantially rejecting signals having the predetermined doppler frequency content at the output thereof and substantially passing signals of a doppler frequency content representative of the uncompensated unbalance in the I and Q input signals to the output thereof. The graph of FIG. 5 is illustrative of the desired doppler filter characteristics for the selected filter 80 wherein to tolerate errors in the doppler test frequency during the rejection thereof there is provided a sufficiently wide null response at the doppler test frequency as shown by the arrow 82. Also provided in the filter characteristics is an adequate pass band at the image of the doppler test frequency as shown by the arrow 84. It is well known that the response of the doppler filter at the image of the doppler test frequency is representative of the unbalance in the gain and phase of the I and Q signal inputs. Thus, the real X1 and imaginary Y1 outputs of the selected doppler filter 80 are representative of the uncompensated unbalance in the I and Q signal inputs of the doppler processor 10.

The sensor system may also include apparatus for generating a reference signal representative of the phase of the predetermined doppler frequency content of the test frequency signal 16 at the output of the selected doppler filter 80. Since the test frequency signal 16 is generally generated by a phase-lock voltage controlled oscillator (VCO) in the signal generator 12, its phase state at any instant of time is known to a reasonable tolerance. In addition, the phase shift of the test frequency signal 16 through the IF stages of the receiver may be estimated and the phase shift through the selected doppler filter 80 may be precisely predicted. These parameters could be utilized to form a phase reference signal for use by the sensor 40. However, the preferred embodiment uses a phase reference generator 86 for generating the phase reference signal 88. The phase reference generator 86 which will be described in greater detail hereinbelow utilizes the real X2 and imaginary Y2 outputs of another selected doppler filter 90 (refer to FIGS. 2 and 4) having characteristics which preferably are the mirror image of filter 80, substantially passing signals having the predetermined doppler frequency content to the output thereof and substantially rejecting signals of a doppler frequency content representative of the uncompensated unbalance in the I and Q input signals at the output thereof.

The sensor 40 may additionally include a demodulator and integrator circuit 92 which includes a demodulator governed by the phase reference signal 88 to demodulate the output signalling X1 and Y1 of the doppler filter 80 in response to the injected test frequency signal 16 for generating separate signals 42 and 44 representative of uncompensated gain and phase unbalance, respectively, in the I and Q input signals to the digital doppler processor 10. The circuit 92 additionally includes an integrator for the integration of each of the generated signals 42 and 44. The demodulation and integration portions of the circuit 92 will be described in greater detail herebelow.

Note that the sensor 40 is coupled to the doppler processor filter outputs in which case all compensation for gain and phase unbalance is accomplished at an earlier stage. Accordingly, the sensor 40 is measuring uncompensated unbalance as part of a servo loop or loops as depicted in the embodiment of FIG. 2. In such feedback arrangements, modest distortion in sensing the unbalance of the I and Q signal inputs has much less impact than in a feed-forward compensation process, such as that described in the Churchill et al. references, supra, for example. This relaxation in required sensor accuracy provides for cost reductions in the implementation thereof. The embodiment of the sensor 40 as described herebelow is considered simpler and less costly than the Churchill et al. teachings, supra, yet retains all of the advantages over the Martin system referred to in the U.S. Pat. No. 4,122,448. Moreover, it tolerates random phase at the time of sampling at the A/D converters 22 and 24, resulting in greater tolerance to A/D converter error and eliminating most restrictions on choice of varying interpulse periods.

Furthermore, because of the choice of doppler filter selection, the instant sensor 40 can tolerate a wider deviation of the doppler frequency content of the instantaneous frequency test signal from the optimum value chosen therefor. Although the average doppler frequency of a phase-locked VCO is automatically controlled precisely, the instantaneous doppler frequency may wander about the average value. As a result, the doppler frequency content of the test frequency signal 16 may normally drift out of the null setting and distort the image frequency response whose amplitude is proportional to the I and Q unbalance. However, in the instant sensor system, the doppler filter characteristics are chosen to have a reasonably wide null rejection band as shown at the arrow 82 in the graph of FIG. 5 to tolerate a reasonable wide deviation of the doppler frequency content of the test frequency signal. Thus, the instant sensor 40 directly samples only the parameters of concern, that is, the response X1 and Y1 of the image of the doppler test frequency. In other words, the doppler test frequency is chosen to fall between two doppler sidelobe peaks 94 and 96 as shown in the graph of FIG. 5, so the filter response at the doppler test frequency is significantly less than the doppler side lobe response it is striving to preserve.

The teachings of Churchill et al. and Martin, supra, sampled the A/D outputs and used mathematical processes which essentially formed simple doppler filters having nulls at one-quarter of the frequency of the input data. For any specified level of undesired output at the doppler test frequency, the required tolerance of the instantaneous frequency of the doppler test tone is a small fraction of that allowed by the instant sensor, because the simple filters do not provide as wide a rejection notch (see FIG. 5). For example, at 50 dB below the peak response, the filter characteristics of FIG. 5 may tolerate an error in the frequency of the doppler test tone of $\pm 1\%$. The doppler filter of Martin's teaching demands a tolerance of $\pm 0.1\%$ for equivalent undesired output, and the demands of the teachings of Churchill et al. are not much better. In summary, the disclosed sensor which will be described in greater detail herebelow exploits the functional characteristics of the existing digital doppler filters of the doppler processor 10 to provide better sensitivity to I and Q unbalance measurements and less sensitivity to extraneous errors than the simple mathematical processes embodied in present unbalance sensors. These doppler filter outputs X1, Y1 and X2, Y2 are selectively available from the doppler processor 10 and reduce the amount of additional data processing in the sensor 40, thereby obstensibly reducing cost as well as improving performance.

Figure 6:
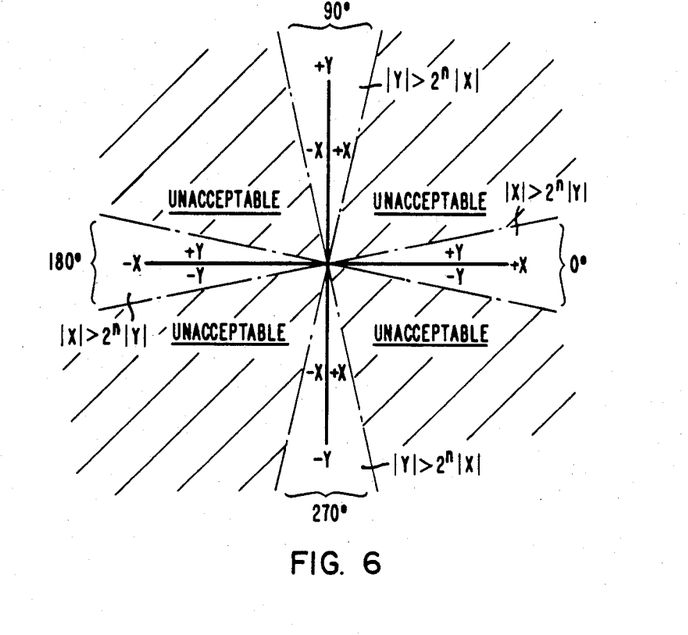
FIG. 6 is a graph used for illustrating one method for generating a phase reference signal for use in a sensor system for measuring uncompensated unbalance in the in-phase I and quadrature Q input signals of a digital doppler processor.

A phase reference generator 86 suitable for use in the embodiment described in connection with FIG. 2 will be described herebelow in connection with FIGS. 6 and 7. The generator 86 includes apparatus for determining which phase region of a predetermined set of phase regions the phase of the X2 and Y2 signals passed by the doppler filter 90 in response to the injected test frequency signal 16 falls into and for generating the phase reference signal 88 corresponding to the determined phase region. More specifically, four phase regions, namely 0°, 90°, 180°, and 270° have been selected for the determination process of the generator 86. A fifth region which includes all other phase conditions is termed as the unacceptable region. These aforementioned regions are depicted in the graph of FIG. 6. The X and Y terminology of the graph correspond to the signals X2 and Y2 of the selected doppler filter 90 (refer to FIG. 2). The width of the acceptable regions may be determined by a multiplication factor $2^n$ where the exponent n may be varied.

Figure 7:
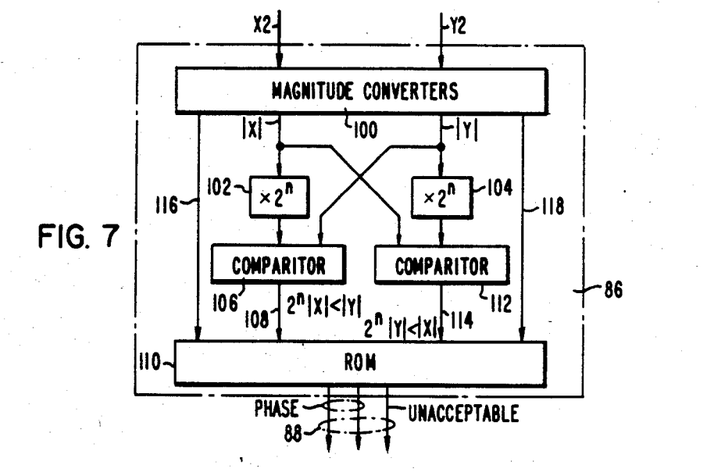
FIG. 7 is a block diagram schematic of an embodiment of a phase reference generator operative in accordance with the methods illustrated in the graph of FIG. 6.

A block diagram schematic of a preferred embodiment for the phase reference generator is shown in FIG. 7. Referring to FIG. 7, the magnitude of the X2 and Y2 signals are determined by conventional magnitude converters 100. The resulting magnitudes $|X|$ and $|Y|$ may be multiplied by their multiplication factors to $2^n$ in functional blocks 102 and 104, respectively. For the purposes of the present embodiment, the blocks 102 and 104 may be implemented by shift registers whereby the multiplication may be accomplished by simply shifting the digital code representative of the absolute magnitude n bits to the left. A typical value of n for the present embodiment may be 2.

Further, the multipled magnitude of $|X|$ and the unmultiplied magnitude of $|Y|$ are provided to the inputs of a comparator 106 to determine the comparison of $2^n \cdot |X| < |Y|$. The state of the digital output signal 108 is representative of the result of the comparison of 106 and is provided as one address input to a read-only memory (ROM) 110. Likewise, the multiplied amplitude of $|Y|$ and the unmultiplied amplitude of $|X|$ are provided to another comparator 112 for determining the comparison $2^n \cdot |Y| < |X|$. And similarly, the state of the comparator's output signal 114 is representative of the results of the comparison of 112 and is provided to the ROM 110 as another address input thereof. Moreover, the polarities of the signals X2 and Y2 may be determined in the magnitude converters 100 and respective signals 116 and 118 representative thereof may be provided as additional address inputs to the ROM 110. Accordingly, the ROM 110 may be preprogrammed in a conventional manner to respond to the address inputs thereof to provide a digital code over signal lines 88 representative of the determined phase region of the signals X2 and Y2. A suitable phase logic programming arrangement for the ROM 110 is shown in Table 2 found herebelow:

TABLE 2

PHASE LOGIC

| ADDRESS INPUTS | | | | |
|---|---|---|---|---|
| $\|X\| > 2^n\|Y\|$ | $\|Y\| > 2^n\|X\|$ | POLARITY X | POLARITY Y | PHASE OUTPUT |
| 1 | 0 | 0 | 0 | 0° |
| 1 | 0 | 0 | 1 | 0° |
| 0 | 1 | 0 | 0 | 90° |
| 0 | 1 | 1 | 0 | 90° |
| 1 | 0 | 1 | 0 | 180° |
| 1 | 0 | 1 | 1 | 180° |
| 0 | 1 | 0 | 1 | 270° |
| 0 | 1 | 1 | 1 | 270° |
| 0 | 0 | x | x | UNACCEPTABLE |
| 1 | 1 | x | x | IMPOSSIBLE |

In operation, the generator 86 as described in connection with the embodiment of FIG. 7, first determines if $|X|$ is greater than the multiplied $|Y|$ in which case, the phase would fall into either the 0° or 180° predetermined phase regions as shown by the graph of FIG. 6. It may next determine the polarity of X to determine which of the two regions 0° and 180° the phase actually falls into. Similarly, if the circuit 86 determines that $|Y|$ is greater than the multiplied $|X|$, then the phase falls in one of the regions 90° or 270°. Next, the polarity of Y determines which of the two regions the phase actually falls into. In Table 2, an affirmative response from the comparators 106 and 112 over signal lines 108 and 114 is indicated by a logical one and in addition, a positive polarity over signal lines 116 and 118 is also indicated by a logical one. Consequently, a logical zero response from both of the comparators 106 and 112 indicates that the phase falls into the shaded or unacceptable regions as shown by the graph of FIG. 6, i.e., independent of the polarity of either X or Y denoted by x in Table 2. In the present embodiment, the ROM 110 may output a two bit digital code representative of the determined phase region over two of the signal lines 88. The state of the third line may be representative of whether or not the phase actually falls into an unacceptable region.

Another embodiment of a phase reference signal generator is found in the U.S. Pat. No. 4,231,005, issued to J. W. Taylor, Jr. on Oct. 28, 1980, which is made reference to herein for the description of the details thereof.

Figure 8:
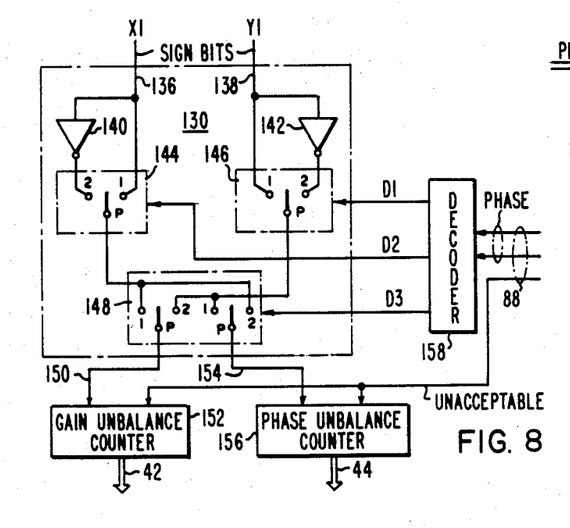
FIG. 8 is a block diagram schematic of one embodiment of a demodulator and integrator suitable for use in a sensor system for measuring uncompensated unbalance in the in-phase I and quadrature Q input signals of a digital doppler processor.
Figure 8A:
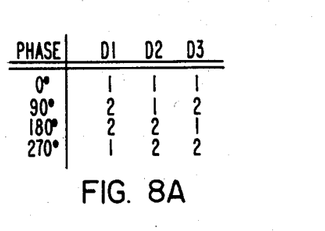
FIG. 8A is a table of decoder instructions suitable for use in the embodiment of FIG. 8.

A suitable embodiment for the demodulator and integrator circuit 92 will be described in connection with FIGS. 8 and 8A. In essence, the demodulator 92 includes apparatus which is governed by the phase reference signal 88 for selecting one of the sign bits of the X1 and Y1 component signals input thereto or the complements thereof as representative of the gain unbalance signal and another as representative of the phase unbalance signal. A simple embodiment for performing this demodulation function is depicted by the block diagram schematic of FIG. 8. Referring to FIG. 8, sign bits of the X1 and Y1 signals may be provided to the demodulation portion 130 over signal lines 136 and 138, respectively. One state of the signals 136 and 138 denotes a positive polarity and another state denotes a negative polarity of their corresponding X1 and Y1 signals. Inverters 140 and 142 invert the states of the signals 136 and 138, respectively, to form the complements thereof. The uninverted and inverted signals 136 are coupled to positions 1 and 2 of a single pole, double throw functional switch 144. Similarly, the uninverted and inverted signals 138 are coupled to position 1 and position 2, respectively, of another single pole, double throw functional switch 146. In addition, a double pole, double throw switch is provided and coupled to the pole outputs of the switches 144 and 146 in such a conventional manner as to select the output signal of one of the switches 144 and 146 as the gain representative signal and the other output signal of the switches 144 and 146 as the phase representative signal in one state and vice versa in another state.

The gain unbalance representative signal 150 may be integrated utilizing an up/down conventional counter 152. The signal 150 may be applied to the UP/DN control input of the counter 152 to govern the increase or decrease of the counter contents at some predetermined rate. A selected number of the more significant bits may be provided at the output of the counter 152 as the integrated gain unbalance signal 42. Similarly, the phase representative signal 154 may be applied to the UP/DN control of another conventional up/down counter 156 for integrating purposes which is operational in the same manner as that of counter 152. Likewise, the more significant bits of the counter 156 may be selected as the integrated phase unbalance signal 44. Moreover, the unacceptable logic signal of the phase reference coded signals 88 may be applied to an inhibit input of the counters 152 and 156 to prevent counting or integrating thereof at times when the phase unbalance is determined to be in an unacceptable region.

The phase coded signal of 88 may be provided to a conventional decoder circuit 158 which supplies signals D1, D2 and D3 for the operation of the switches 146, 144, and 148, respectively. The decoder 158 may be preprogrammed to operate in accordance with the Table of FIG. 8A to position the switches to their appropriate states in accordance with the determined phase unbalance of the coded signals 88. For example, if the determined phase region is 0°, switches 146, 144 and 148 are governed to position 1 in which case the uninverted polarity signal 136 is selected as the gain unbalance representative signal 150 and the uninverted polarity signal 138 is selected as the phase unbalance representative signal 154 and so on.

Figure 9:
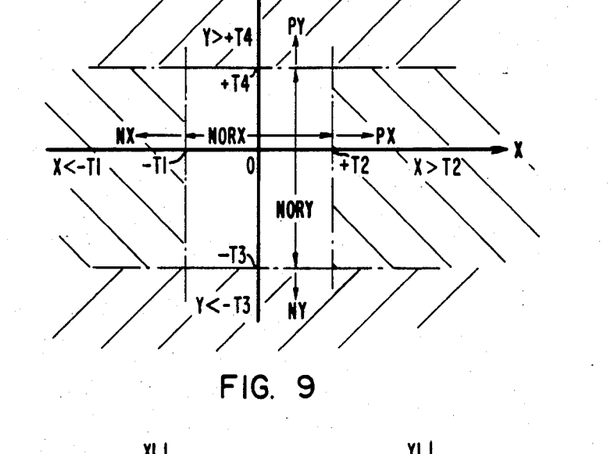
FIG. 9 is a graph illustrating the operational method of another embodiment of a modulator for use in an unbalance measuring sensor system.
Figure 10:
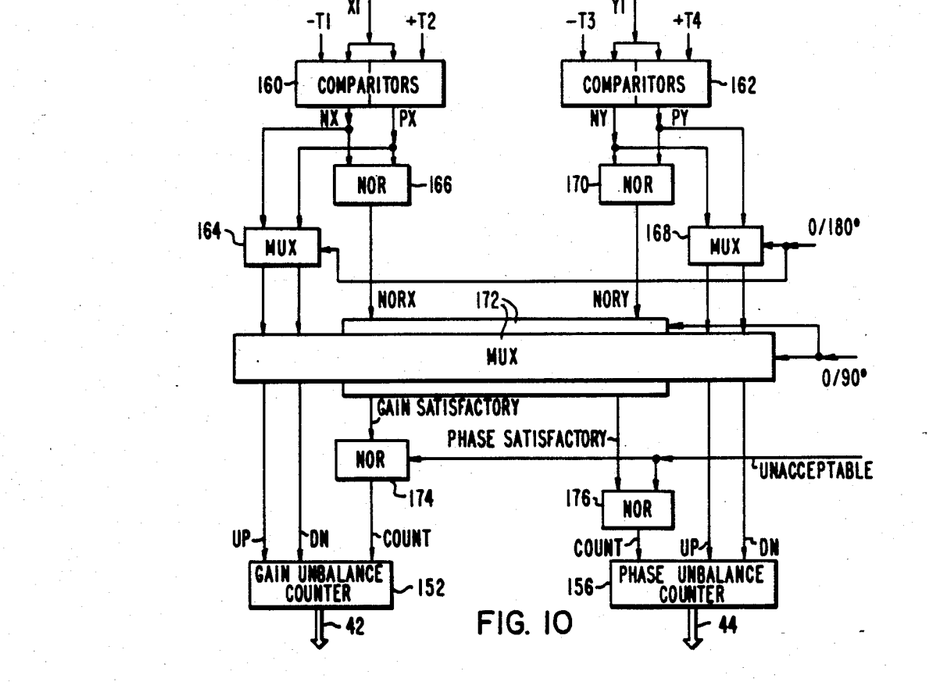
FIG. 10 is a block diagram schematic of an alternate embodiment of a demodulator and integrator which operates in accordance with the method illustrated in the graph of FIG. 9.

An alternate embodiment will be described in connection with FIGS. 9 and 10 herebelow. As illustrated by the graph of FIG. 9, the concept of this alternate embodiment provides for determining which of three predetermined regions each of the X1 and Y1 component signals occur in. The regions are divided along the X-axis by the thresholds $-T1$ and $+T2$. Similarly, the Y-axis is also broken into three predetermined regions by the threshold signals $-T3$ and $+T4$. Referring to FIG. 10, the X1 region determination is accomplished by a pair of comparators conventionally arranged as a window comparator as depicted by the block 160. The Y1 region determination is accomplished by a similarly arranged pair of comparators denoted by the block 162.

The outputs NX and PX of the comparators 160 are coupled to a multiplexer switch 164 and also to the inputs of a conventional NOR gate 166. Likewise, the outputs NY and PY of the comparators 162 are coupled to another multiplexer switch 168 and a NOR gate 170. The outputs of the MUX 164 and NOR gate 166 comprise a first set of coded signals which are representative of the comparison determination associated with the X1 signal and likewise, the outputs of the MUX switch 168 and NOR gate 170 comprise a second set of coded signals which are representative of the comparison determination associated with the Y1 signal. Both sets of coded signals are provided to another multiplexer switch or pair of switches 172 which is operative to select one of the first and second sets of coded signals as representative of the gain unbalance and the other of the first and second sets of coded signals are representative of the phase unbalance. The multiplexer switches 164 and 168 are governed by the phase reference coded signal 0°/180° and the multiplexer switch or switches 172 is governed by the phase reference coded signal 0°/90°. A suitable operational pattern for the multiplexer switches 164, 168 and 172 as governed by the phase coded signals is set forth in Table 3 found directly herebelow:

TABLE 3

| PHASE | GAIN UNBAL COUNTER 152 | | | PHASE UNBAL COUNTER 156 | | |
|---|---|---|---|---|---|---|
| | UP | DOWN | SATISFACTORY | UP | DOWN | SATISFACTORY |
| 0° | PX | NX | NOR X | PY | NY | NOR Y |
| 90° | NY | PY | NOR Y | PX | NX | NOR X |
| 180° | NX | PX | NOR X | NY | PY | NOR Y |
| 270° | PY | NY | NOR Y | NX | PX | NOR X |

NX represents $X < -T1$
PX represents $X > +T2$
NY represents $Y < -T3$
PY represents $Y > +T4$
NOR X represents $-T1 \leq X \leq +T2$
NOR Y represents $-T3 \leq Y \leq +T4$ Here again, the selected coded signals representative of the gain unbalance are used to govern the gain unbalance integrating counter 152 and likewise the selected coded set representative of the phase unbalance is used to govern the integrating counter 156. Note that this alternate embodiment includes a satisfactory region, denoted as the unshaded region in FIG. 9 in which either the X1 or Y1 signals or both may fall into, and represents a satisfactory or no-change condition with regard to the integration process. Normally, the values of T1, T2, T3 and T4 are made equal to a common value T to create a square unshaded satisfactory region in FIG. 9.

In the embodiment of FIG. 10, the gain satisfactory and phase satisfactory signals from the multiplexer switch or switches 172 may be coupled to one input of the NOR gates 174 and 176, respectively, and the unacceptable signal of the phase reference coded signals 88 is commonly coupled to the other input of each NOR gate. Thus, when neither the satisfactory signal nor unacceptable signal is in the affirmative state the respective counter 152 or 156 is permitted to perform its integration operation according to the states of the UP and DN governing inputs thereto.

In some sensor systems, it may be desirable that the integrating counters 152 and 156 provide an indication of fault when the limits of control of the counting devices is reached. For example, the UP count is prevented when the TOP LIMIT is reached, and the DN count is prevented when tthe BOTTOM LIMIT is reached. Either limit situation or event may create a fault indicator. In addition, since the more significant bits of these integrating counters 152 and 156 are selected to provide commands to their respective gain and phase compensation devices of their associated servo loops as described in connection with the embodiment of FIG. 2, for example, the number of counter bits usually determines the maximum rate of change of compensation. These last two functions are usually considered auxiliary elements common to many closed-loop servo processes.

Integration is generally included in servo systems to enhance the response to the parameter being controlled, and to reduce the response to extraneous errors which appear in the individual error samples. For the system of FIG. 2, extraneous error may be created by the instantaneous frequency of the doppler test signal deviating from that desired, by inaccuracy of the A/D converters 22 and 24, or by interference from external sources, for example. The integrating counters 152 and 156 provide minimal reaction to occasional pulse interference which may be received, even though the gain of a radar receiver, for example, is drastically reduced at the time of the doppler test frequency signal injection. It is intended that no matter how strong the interfering pulse, the responding counter 152 or 156 increments only one step, where many steps are required to change the bits of the counter which represent the measured gain or phase unbalance.

What is claimed is:

1. A sensor system for measuring uncompensated unbalance in the in-phase I and quadrature Q input signals of a digital doppler processor which includes a set of digital doppler filters, said I and Q input signals being provided to said doppler processor through respective I and Q channels, said sensor system including means for generating a test frequency signal having imposed thereon a predetermined doppler frequency content and for injecting said test frequency signal, at times, through said I and Q channels to render the I and Q component signals thereof at their respective inputs of said doppler processor, one doppler filter of said doppler processor having characteristics of substantially rejecting signals having said predetermined doppler frequency content at the output thereof and substantially passing signals of a doppler frequency content representative of said uncompensated unbalance in said I and Q input signals to the output thereof, said sensor system comprising:

first means for generating a reference signal representative of the phase of said predetermined doppler frequency content of said test frequency signal at the output of said one doppler filter; and second means governed by said phase reference signal to demodulate the output signalling of said one doppler filter in response to said injected test frequency signal for generating separate signals representative of uncompensated gain and phase unbalance in the I and Q input signals to said digital doppler processor.

2. The sensor system in accordance with claim 1 including an integrator for each generated signal of the second means for the integration thereof.

3. The sensor system in accordance with claim 1 wherein the doppler processor includes another doppler filter having characteristics of substantially passing signals having the predetermined doppler frequency content to the outut thereof and substantially rejecting signals of a doppler frequency content representative of the uncompensated unbalance in the I and Q input signals at the output thereof; and wherein the first means includes means for determining the phase of the output signalling of said another doppler filter in response to the injected test frequency signal and for generating a reference signal representative thereof.

4. The sensor system in accordance with claim 3 wherein the another doppler filter has characteristics which are the mirror-image of the one doppler filter.

5. The sensor system in accordance with claim 3 wherein the another doppler filter substantially passes signals representative of the real X and imaginary Y components of the doppler frequency content of the injected test frequency signal; and wherein the first means includes means for determining which phase region of a predetermined set of phase regions the phase of said X and Y signals passed by the another doppler filter in response to the injected test frequency signal falls into and for generating a phase reference signal corresponding to said determined phase region.

6. The sensor system in accordance with claim 5 wherein the first means includes means for altering the size of the phase regions of the predetermined set.

7. The sensor system in accordance with claim 5 wherein the phase region determining means includes:
third means for deriving the magnitude and polarity of each of the X and Y signals of the another doppler filter and for generating signals representative thereof; and
fourth means governed by the derived magnitude and polarity signals of the X and Y signals passed by the another doppler filter in response to the injected test frequency signal to determine the phase region in which the phase of the corresponding X and Y signals occurs.

8. The sensor system in accordance with claim 7 wherein the fourth means includes:
means for amplifying the X and Y magnitude signals;
means for comparing the X amplified magnitude signal with the Y unamplified magnitude signal and for comparing the Y amplified magnitude signal with the X unamplified magnitude signal to determine in each case the larger of the two and for generating respective signals indicative of the results of said comparisons; and
means governed by the X and Y polarity signals and the signals generated by said comparing means corresponding thereto to determine the phase region in which the phase of the corresponding X and Y signals occurs.

9. The sensor system in accordance with claim 1 wherein the one doppler filter substantially passes signals representative of the real X and imaginary Y components of the uncompensated unbalance in the I and Q input signals to the output thereof in response to the injected test frequency signal; and wherein the second means includes means governed by the phase reference signal for selecting one of said X and Y component signals as representative of said gain unbalance signal and the other as representative of said phase unbalance signal.

10. The sensor system in accordance with claim 9 wherein the X and Y component signals include signals representative of the polarity thereof; and wherein the second means includes means governed by the phase reference signal to select one of said polarity signals of the X and Y component signals as representative of the gain unbalance and another of said polarity signals as representative of the phase unbalance.

11. The sensory system in accordance with claim 10 including: a first up/down counter governed by the selected signal representative of the gain unbalance for the integration thereof; and a second up/down counter governed by the selected signal representative of the phase unbalance for the integration thereof.

12. The sensor system in accordance with claim 9 wherein the second means includes: first comparison means for determining which of three predetermined regions the X component signal occurs in and for generating a first set of coded signals representative of said comparison determination; second comparison means for determining which of three predetermined regions the Y component signal occurs in and for generating a second set of coded signals representative of said comparison determination; and means governed by the phase reference signal to select one of said first and second sets of coded signals as representative of the gain unbalance and the other of said first and second sets of coded signals as representative of the phase unbalance.

13. The sensor system in accordance with claim 12 wherein the second means includes means governed by the phase reference signal to transpose the coded signals within the first and second sets.

14. The sensor system in accordance with claim 12 including: a first up/down counter governed by the selected set of coded signals representative of the gain unbalance for the integration thereof; and a second up/down counter governed by the selected set of coded signals representative of the phase unbalance for the integration thereof.

15. Method of compensating a digital doppler processor for unbalance in in-phase I and quadrature Q signal inputs thereof, said method comprising the steps of:
measuring the unbalance in said I and Q signal inputs to said digital doppler processor;
determining a desired set of weighting coefficients based on said measured unbalance; and
performing doppler filter calculations in said digital doppler processor with said desired set of weighting coefficients.

16. The method in accordance with claim 15 wherein the step of measuring includes measuring the gain unbalance in the I and Q input signals; and wherein the step of determining includes determining the desired set of weighting coefficients based on said measured gain unbalance.

17. The method in accordance with claim 16 wherein the step of determining includes the steps of:
precomputing a set of weighting coefficients for each condition of a predetermined set of gain unbalance conditions;

identifying the present gain unbalance condition from the corresponding measured gain unbalance in the I and Q signal inputs; and selecting the desired set of weighting coefficients from aid precomputed sets of weighting coefficients based on said identified present gain unbalance condition.

18. The method in accordance with claim 17 wherein the desired set of weighting coefficients are precomputed in accordance with the following expressions:

$$A_{nx} = A_n/k_i$$

$$B_{nx} = k_i B_n$$

$$A_{ny} = k_i A_n$$

and $$B_{ny} = B_n/k_i;$$

where $k_i$ represents each of a predetermined set of gain unbalance conditions $\{k_i: i = 1 \text{ to } M\}$, where $A_n + jB_n$ (for $n = 1$ to $N$) represent the set of weighting coefficients of an N-pulse doppler filter for the balanced condition of $k_i = 1$, where for each of the unbalanced conditions of $k_i \neq 1$, $i = 1$ to M, $A_{nx} + jB_{nx}$ (for $n = 1$ to $N$) represent the precomputed set of weighting coefficients for calculating the real component of the doppler filter output for each condition i, and $A_{ny} + jB_{ny}$ (for $n = 1$ to $N$) represent the precomputed set of weighting coefficients for calculating the imaginary component of the doppler filter output for each condition i.

19. The method in accordance with claim 18 wherein the step of precomputing includes the steps of:

shifting the phase conditions of the precomputed set of complex weighting coefficients $A_{nx} + jB_{nx}$ and $A_{ny} + jB_{ny}$ to satisfy the following expressions:

$$\sum_{n=1}^{N} B_{nx} = 0, \text{ and } \sum_{n=1}^{N} B_{ny} = 0;$$

and deriving real $\overline{X}$ and imaginary $\overline{Y}$ offset corrections for the real X and imaginary Y doppler filter outputs, respectively, using the phase shifted precomputed weighting coefficients $A_{nx}$ and $A_{ny}$ in accordance with the following expressions:

$$\overline{X} = \overline{I} \sum_{n=1}^{N} A_{nx} \text{ and}$$

$$\overline{Y} = \overline{Q} \sum_{n=1}^{N} A_{ny}$$

where $\overline{I}$ and e,ovs/Q/ are representative of the real and imaginary components, respectively, of the input signal offset to the digital doppler filter.

20. The method in accordance with claim 16 wherein the step of determining includes the step of computing the desired set of weighting coefficients as a function of the corresponding measured gain unbalance in the I and Q signal inputs.

21. The method in accordance with claim 20 wherein the desired set of weighting coefficients are computed in accordance with the following expressions:

$$A_{nx} = A_n/k$$

$$B_{nx} = kB_n$$

$$A_{ny} = kA_n \text{ and}$$

$$B_{ny} = B_n/k;$$

where k represents the corresponding measured gain unbalance in the I and Q signal inputs;

where $A_n + jB_n$ (for $n = 1$ to $N$) represent the set of weighting coefficients of an N-pulse doppler filter for the balanced condition of $k = 1$, where for the unbalanced condition of $k \neq 1$, $A_{nx} + jB_{nx}$ (for $n = 1$ to $N$) represent desired set of weighting coefficients for calculating the real component of the doppler filter output, and $A_{ny} + jB_{ny}$ (for $n = 1$ to $N$) represent the desired set of weighting coefficients for calculating the imaginary component of the doppler filter output.

22. The method in accordance with claim 21 wherein the step of precomputing includes the steps of:

shifting the phase conditions of the instantaneously computed set of complex weighting coefficients $A_{nx} + jB_{nx}$ and $A_{ny} + jB_{ny}$ to satisfy the following expressions:

$$\sum_{n=1}^{N} B_{nx} = 0, \text{ and } \sum_{n=1}^{N} B_{ny} = 0;$$

and deriving real $\overline{X}$ and imaginary $\overline{Y}$ offset corrections for the real X and imaginary Y doppler filter outputs, respectively, using the phase shifted precomputed weighting coefficients $A_{nx}$ and $A_{ny}$ in accordance with the following expressions:

$$\overline{X} = \overline{I} \sum_{n=1}^{N} A_{nx} \text{ and}$$

$$\overline{Y} = \overline{Q} \sum_{n=1}^{N} A_{ny}$$

where $\overline{I}$ and $\overline{Q}$ are representative of the real and imaginary components, respectively, of the corresponding input signal offset to the digital doppler filter.

23. System for compensating a digital doppler processor for unbalance in in-phase I and quadrature Q signal inputs thereof, said system comprising:

a sensor for measuring the unbalance in said I and Q signal inputs to said digital doppler processor;

means for determining a desired set of weighting coefficients based on said measured unbalance of said sensor; and means for performing the doppler filter calculations of said digital doppler processor with said weighting coefficients.

24. Th system in accordance with claim 23 wherein the sensor includes means for measuring the unbalance in the I and Q input signals; and wherein the determining means includes means for determining the desired set of weighting coefficients based on said measured gain unbalance of the sensor.

25. The system in accordance with claim 24 wherein the determining means includes a memory for storing a precomputed set of weighting coefficients for each condition of a predetermined set of gain unbalance conditions; and wherein the sensor includes means for providing a digitally coded address representative of the present gain unbalance condition based on the corresponding measured gain unbalance to said memory for accessing the desired set of precomputed weighting coefficients corresponding to said present gain unbalance condition therefrom for use in the doppler filter calculations of said digital doppler processor.

26. The system in accordance with claim 24 wherein the determining means includes means for calculating the desired set of weighting coefficients as a function of the corresponding measured gain unbalance in the I and Q signal inputs.

27. The system in accordance with claim 24 wherein the determining means includes means for calculating the desired set of weighting coefficients in accordance with the following expressions:

$$A_{nx} = A_n/k$$

$$B_{nx} = kB_n$$

$$A_{ny} = kA_n \text{ and}$$

$$B_{ny} = B_n/k$$

where k represents the corresponding measured gain unbalance of the sensor;

where $A_n + jB_n$ (for $n=1$ to N) represent the set of weighting coefficients of an N-pulse doppler filter for the balanced condition of $k=1$, and where for the unbalanced condition of $k \neq 1$, $A_{nx} + jB_{nx}$ (for $n=1$ to N) represent the desired set of weighting coefficients for calculating the real component of the doppler filter output, and $A_{ny} + jB_{ny}$ (for $n=1$ to N) represent the desired set of weighting coefficients for calculating the imaginary component of the doppler filter output.

28. The system in accordance with claim 26 wherein the digital doppler processor includes means operative functionally as a 2-pulse digital canceller and an $N-1$ pulse doppler filter in cascade therewith for computing real X and imaginary Y components of the output of said $N-1$ pulse doppler filter in accordance with the following expressions:

$$X = \sum_{n=1}^{N} C_{nx}(I_n - I_{n-1}) \pm \sum_{n=2}^{N} D_{nx}(Q_n - Q_{n-1}), \text{ and}$$

$$Y = \sum_{n=2}^{N} \pm D_{ny}(I_n - I_{n-1}) + \sum_{n=2}^{N} C_{ny}(Q_n - Q_{n-1}),$$

where $C_{nx} + jD_{nx}$ (for $n=2$ to N) represent the desired set of weighting coefficients for computing X, $C_{ny} + jD_{ny}$ (for $n=2$ to N) represent the desired set of weighting coefficients for computing Y, and $(I_n - I_{n-1})$ and $(Q_n - Q_{n-1})$, for $n=2$ to N, represent the in-phase and quadrature outputs, respectively, of the 2-pulse digital canceller for samples 1 to N of the real I and imaginary Q signal inputs; and wherein the determining means includes means for calculating the desired set of weighting coefficients for the $N-1$ pulse doppler filter in accordance with the following expressions:

$$C_{nx} = kC_n$$

$$C_{ny} = C_n/k$$

$$D_{nx} = D_n/k$$

$$D_{ny} = kD_n$$

where $C_2 = A_1$ and $C_{n+1} = A_n + C_n$ (for $n=2$ to N)
where $D_2 = B_1$ and $D_{n+1} = B_n + D_n$ (for $n=2$ to N)
where k represents the corresponding measured gain unbalance of the sensor, and
where $A_n + jB_n$ (for $n=1$ to N) represent the set of weighting coefficients of an N-pulse doppler filter for the balanced condition of $k=1$.

* * * * *